US012609019B2

(12) United States Patent
Goss et al.

(10) Patent No.: US 12,609,019 B2
(45) Date of Patent: Apr. 21, 2026

(54) HABIT TRAINING DEVICE EMPLOYING PROXIMITY SENSORS FOR SUBJECT DETECTION

(71) Applicants: Aaron Goss, Statesville, NC (US); William Black, Salisbury, NC (US)

(72) Inventors: Aaron Goss, Statesville, NC (US); William Black, Salisbury, NC (US)

( * ) Notice: Subject to any disclaimer, the term of this patent is extended or adjusted under 35 U.S.C. 154(b) by 10 days.

(21) Appl. No.: 18/603,740

(22) Filed: Mar. 13, 2024

(65) Prior Publication Data

US 2025/0292668 A1 Sep. 18, 2025

(51) Int. Cl.

*G08B 21/22* (2006.01)
*G08B 21/18* (2006.01)
*G08B 21/24* (2006.01)

(52) U.S. Cl.

CPC .......... *G08B 21/22* (2013.01); *G08B 21/182* (2013.01); *G08B 21/245* (2013.01)

(58) Field of Classification Search

CPC ..... G08B 21/22; G08B 21/182; G08B 21/245
See application file for complete search history.

(56) References Cited

U.S. PATENT DOCUMENTS

2005/0133526 A1* 6/2005 Lewis .................. A47K 5/1204 222/1
2007/0182571 A1* 8/2007 Kennish ............... A47K 5/1217 340/521

* cited by examiner

*Primary Examiner* — An T Nguyen
(74) *Attorney, Agent, or Firm* — Kenneth Brooks; Andrew Rapacke

(57) ABSTRACT

A habit-forming device to sense the presence of a child-height individual in an environment is disclosed, including a housing mounted via a mounting system to a surface. At least one sensor is provided to determine the presence of a child-height individual in the environment. A speaker emits an audible cue to the child-height individual, the audible cue to provide a reminder to perform a habit. Once the device confirms the presence of the child-height individual, the audible cue is emitted to aid in the training of the habit.

14 Claims, 5 Drawing Sheets

HABIT TRAINING DEVICE EMPLOYING PROXIMITY SENSORS FOR SUBJECT DETECTION

TECHNICAL FIELD

The embodiments disclosed herein generally relate to proximity sensors and more particularly to a habit training device employing ultrasonic proximity sensors to detect a human subject.

BACKGROUND

Proximity sensors are used to detect the presence of individuals in an environment. They are often employed for security purposes, such as to enable or disable access to a device or area, or for convenience, such as to initiate the operation of items when a human is present. Many simple iterations exist which simply determine if an object or individual is within a target range of the proximity sensor.

During adolescence, children receive various instructions from parents which aid in them in performing tasks and forming good habits. Parents often find it difficult to consistently provide timely reminders to their child. Few products exist which aid in developing positive habits through adolescence.

SUMMARY OF THE INVENTION

This summary is provided to introduce a variety of concepts in a simplified form that is further disclosed in the detailed description of the embodiments. This summary is not intended for determining the scope of the claimed subject matter.

The embodiments provided herein relate to a habit-forming device to sense the presence of a child-height individual in an environment, including a housing mounted via a mounting system to a surface. At least one sensor is provided to determine the presence of a child-height individual in the environment. A speaker emits an audible cue to the child-height individual, the audible cue to provide a reminder to perform a habit. Once the device confirms the presence of the child-height individual, the audible cue is emitted to aid in the training of the habit.

The habit training system may involve delivering timely cues to remind a male child to lift and lower the toilet seat. To accomplish this, a device is attached to the wall above the toilet that is capable of detecting a child-height individual standing at the toilet. Upon detecting such an individual, the device generates an audio and/or visual cue to remind the individual to lift the toilet seat prior to using the toilet. Further the device may generate a cue to flush and lower the toilet seat upon departure.

In another example, the habit training system may involve delivering timely cues to remind a child to wash their hands. To accomplish this, the device is attached to the wall near the sink and detect the presence of the child near the sink. Upon detecting the child, the device generates an audible cue to remind the child to wash their hands.

Initially, the cues may help the child comply with parental toilet-use instruction by offering an in-the-moment reminder to comply. Over time, repetition helps the child develop a permanent habit. Similarly, the cues may help the child comply with parental hand-washing instruction by providing an in-the-moment audible reminder to comply.

In one aspect, the first cover and the second cover are pivotally attached to the housing.

In one aspect, the device includes a primary proximity sensor and a secondary proximity sensor. The primary proximity sensor may be operable to detect the presence of an individual. The secondary proximity sensor may be operable to determine the height of the individual and to determine if the individual is the child-height individual.

In one aspect, the sensors may include at least one of the following: an ultrasonic proximity sensor and a passive infrared sensor.

In one aspect, a user interface is positioned on a top surface of the housing. The user interface may include a plurality of buttons to offer the control of various functions of the device including volume, operational settings, sensor sensitivity, etc.

In one aspect, a display provides a visual cue corresponding to the habit.

In one aspect, the mounting system includes a bracket and a receiver, wherein the bracket is secured to the wall and the receiver permits the removal of the housing from the wall.

In one aspect, a charging port is provided receive power input from a power source. The charging port may also facilitate the transmission of information to and from the device.

BRIEF DESCRIPTION OF THE DRAWINGS

A complete understanding of the present embodiments and the advantages and features thereof will be more readily understood by reference to the following detailed description when considered in conjunction with the accompanying drawings wherein.

DETAILED DESCRIPTION

Figure 1:
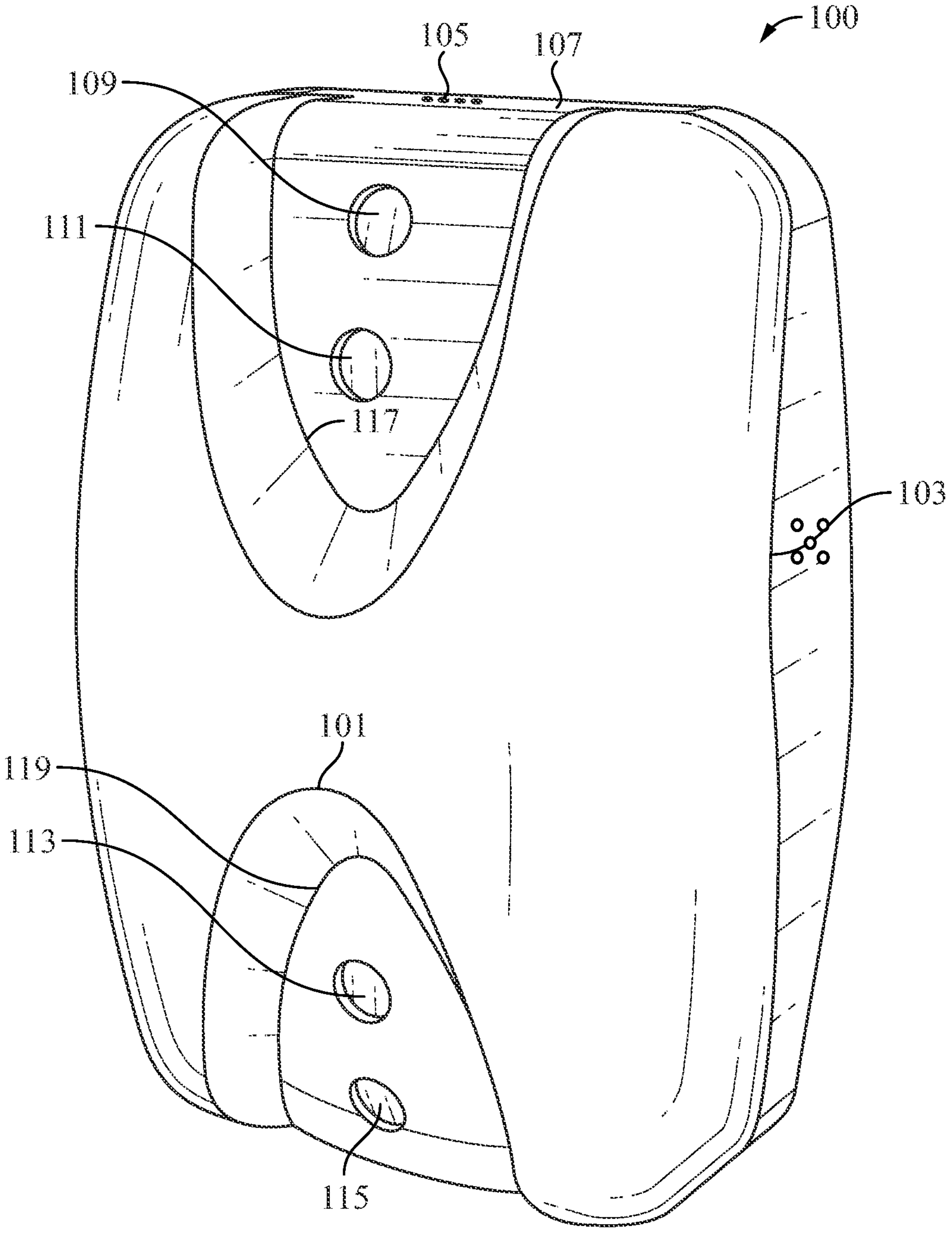
FIG. 1 illustrates a perspective view of the habit-forming device, according to some embodiments.

The specific details of the single embodiment or variety of embodiments described herein are set forth in this application. Any specific details of the embodiments described herein are used for demonstration purposes only, and no unnecessary limitation(s) or inference(s) are to be understood or imputed therefrom.

Before describing in detail exemplary embodiments, it is noted that the embodiments reside primarily in combinations of components related to particular devices and systems. Accordingly, the device components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

In general, the embodiments provided herein relate to a device and method for helping children form healthy and/or useful habits. The device accomplishes this by detecting the presence of a child using ultrasonic proximity detectors, and then playing visual and/or audio cues to help the child remember to perform location-specific actions. For example, the device may be installed on the wall above a toilet, and when a child-height individual is detected standing in front of the toilet, play an audio cue such as "Remember to lift the toilet seat." When the child-height individual departs, the device can generate an additional cue such as "Remember to flush and lower the toilet seat."

Similarly, the device may be positioned to sense a child-height individual near a sink. In this case, when the device senses the child-height individual near the sink, an audio cue such as "Remember to wash your hands" may be played.

One skilled in the arts will readily understand that while the example of a toilet is primarily used to describe a use-case for the device, the device may be used for various use cases. Examples may include the device being positioned near a sink to train the habit of washing hands or brushing teeth, among other examples. In such, the device can be programmed to play a customizable audio cue which can be changed depending on the habit being trained.

The device distinguishes between child-height and adult-height individuals by using a primary proximity sensor to detect whether an individual is present in front of the toilet (or other area where a habit is desired), and a second proximity sensor to detect whether the individual exceeds a height threshold. Both proximity sensors can be aimed by the user. Further, the user can change the installation height on the wall to adjust for the particular heights of individuals in their household. The sensors are programmed to reliably differentiate between a child standing at the toilet, an adult standing at the toilet, and an individual sitting on the toilet. Avoiding false triggers when adults use the toilet is important to the success of the device because adults might remove the device or permanently deactivate it if they are subjected to audio cues when they use the bathroom.

The process helps the child to form habits by generating timely audio cues to perform actions when the child is in the location where the habit is to be performed.

FIG. 1 illustrates the habit-forming device 100 as viewed from the front side 101 of the device 100. The device 100 includes a housing 103 which encases the sensors and electrical components. A user interface 105 is provided on the top surface 107 to allow the user to control the various functionalities of the device. This may include turning the device ON/OFF, adjusting the volume, and/or changing the audio cue which is emitted. Sensors 109,111,113,115 are positioned to determine the presence of individuals within an environment. Sensors 109,111,113,115 may include a PIR (passive infrared) sensor(s), ultrasonic sensor(s), among other forms of motion sensors known in the arts. Sensors 109,111,113,115 are positioned within a first cover 117 and/or second cover 119. Each cover can be rotatable, or able to articulate such that the field-of-view of the sensors can be adjusted as needed. In such, the user may pivot each cover 117,119 to the left, right, upwards, or downwards as needed.

Figure 2:
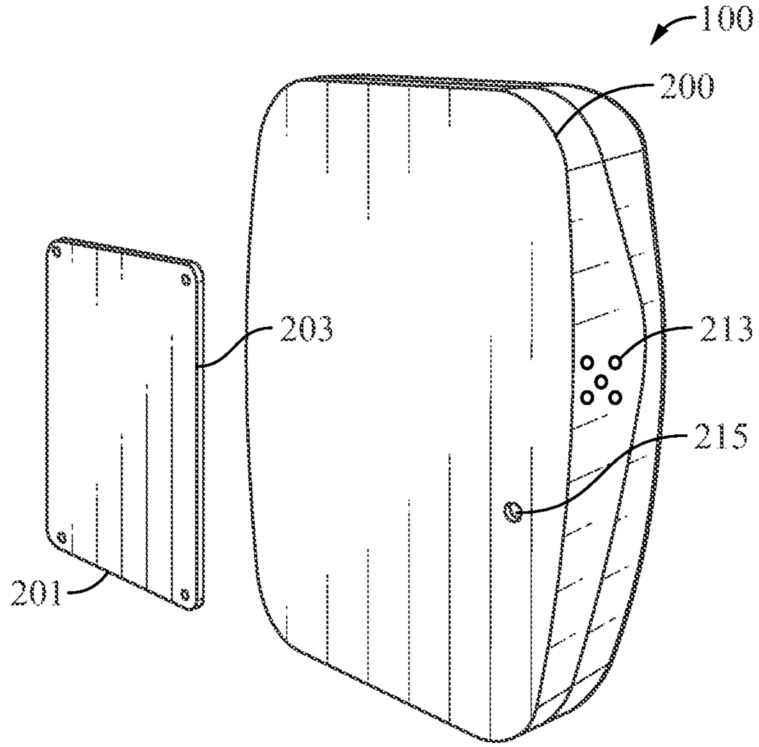
FIG. 2 illustrates a perspective view of the back side of the habit-forming device and mounting component, according to some embodiments.
Figure 3:
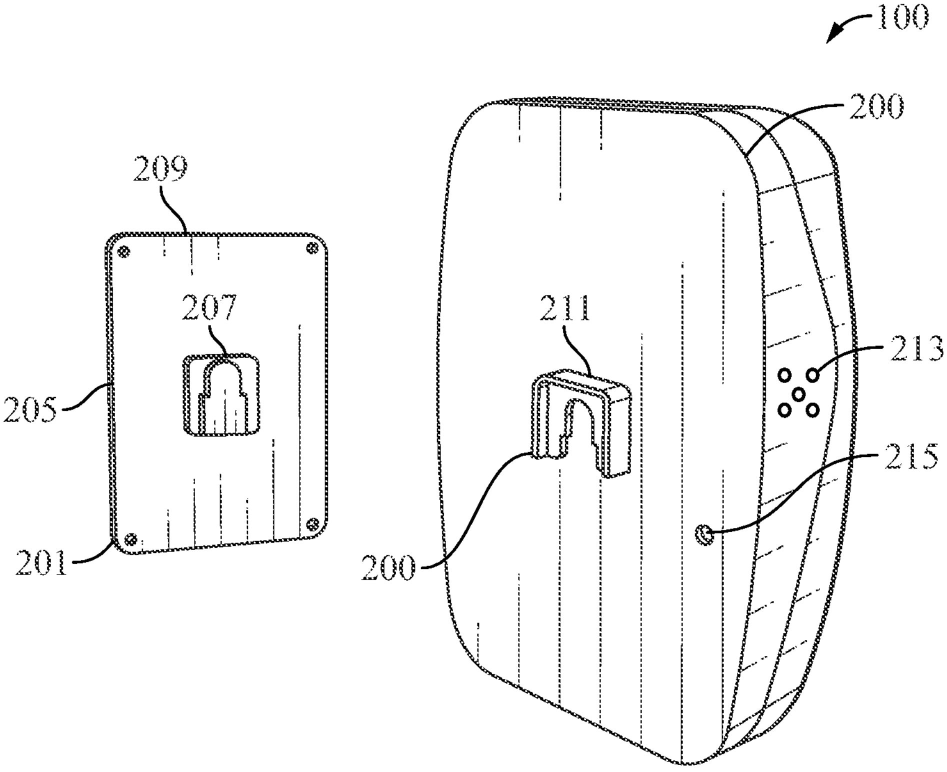
FIG. 3 illustrates a perspective view of the back side of the habit-forming device and mounting component, according to some embodiments.

FIG. 2 and FIG. 3 illustrate the back side 200 of the habit-forming device 100 and mounting system 201. FIG. 2 illustrates the rear side 203 of the mounting system 201 and FIG. 3 illustrates a front side 205 of the mounting system. The rear side 203 contacts the wall or other surface and can be fastened using screws or other fasteners to secure the device 100 thereto. The front side 205 includes a bracket 207 protruding from the front 209 which connects to a receiver 211 positioned on the back side 200 of the device 100. The bracket 207 and receiver 211 allow for the device to be easily mounted and removed from the wall or other surface while providing a secure and stable connection. At least one speaker 213 provides a means for emitting an audible cue, music, or other audio. The speaker 213 is positioned on at least one side of the device 100 but may be positioned nearly anywhere on the housing. A charging port 215 is provided to allow the user to input a charging cable and maintain adequate battery-supplied power to the electrical components of the device 100. The charging port 215 may also be a means for receiving and/or transmitting information from a computing device to and from the device 100. This may allow for firmware updates, software updates, and data to be transmitted to and from the device 100. The mounting system 201 allows the device to be easily removed from the wall when charging is needed.

In some embodiments, the device 100 may include multiple speakers to emit a louder, or more room-filling audio cue.

In some embodiments, the device 100 may be hardwired to a power source. In such, the device 100 may not need to be charged.

Figure 4:
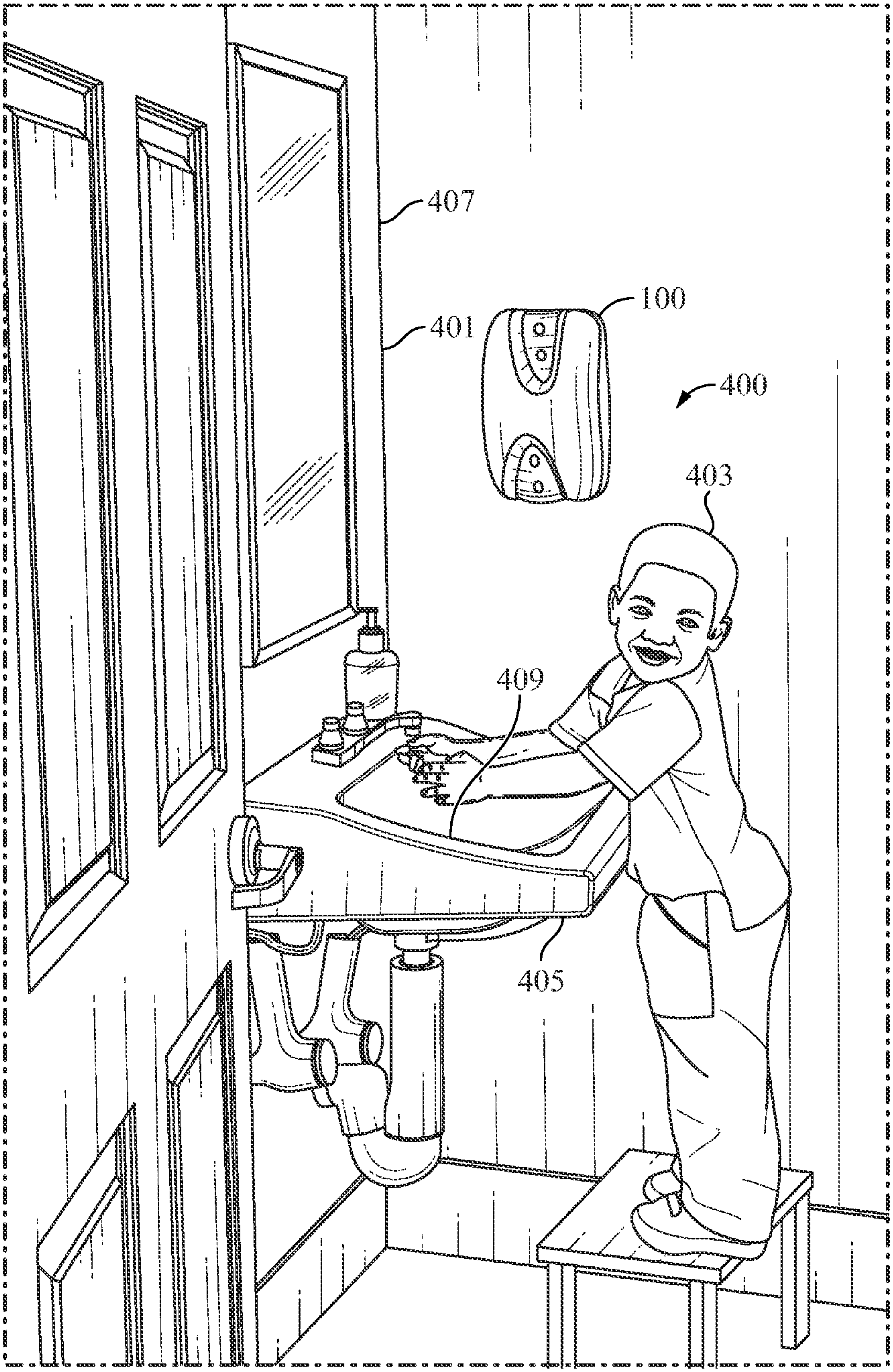
FIG. 4 illustrates a perspective view of the habit-forming device being positioned in a bathroom to sense a child-height individual using a sink, according to some embodiments.
Figure 5:
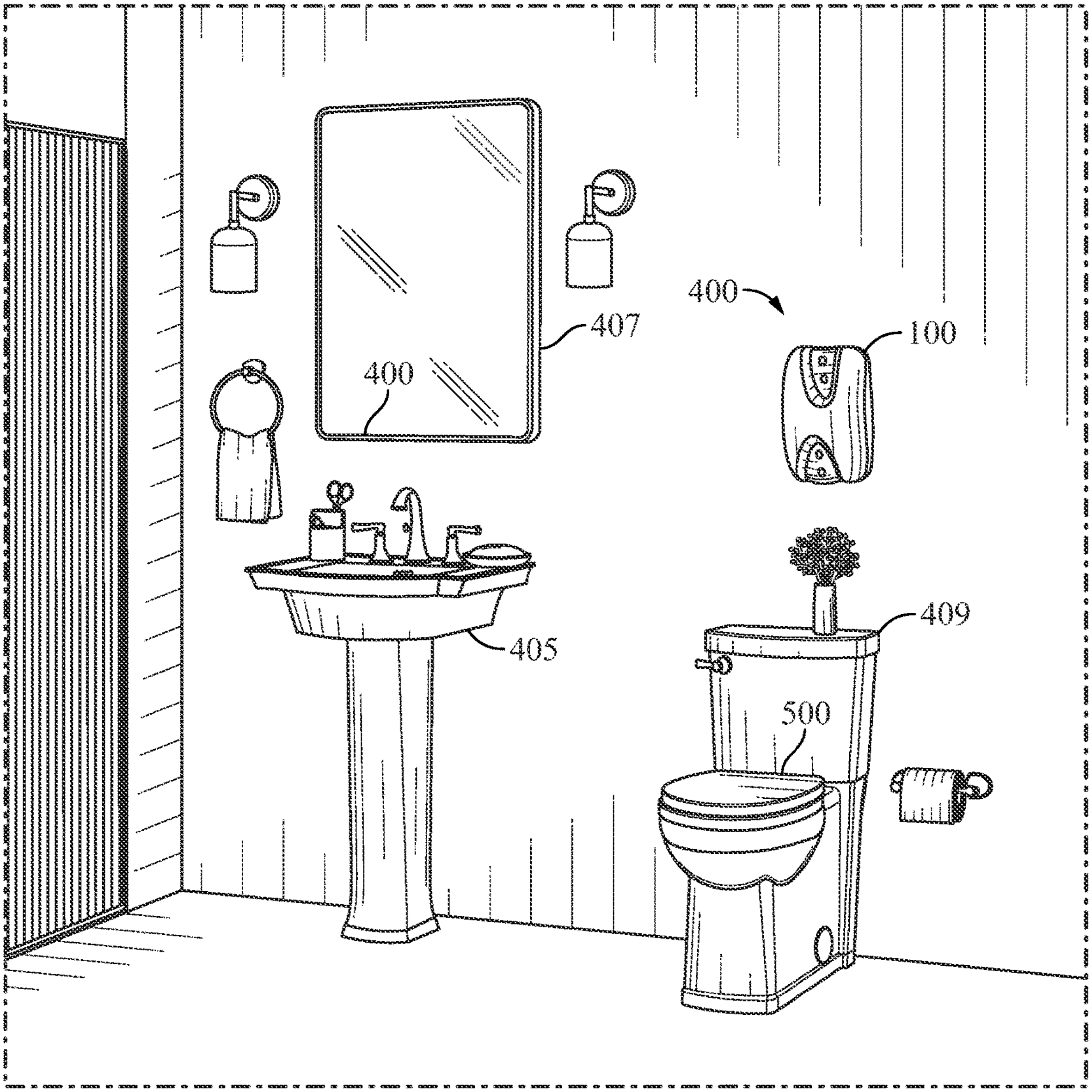
FIG. 5 illustrates a perspective view of the habit-forming device being positioned in a bathroom to sense a child-height individual using a toilet, according to some embodiments.

FIG. 4 and FIG. 5 illustrate the habit-forming device 100 being positioned in an environment 400 (such as a bathroom 401) to sense a child-height individual 403 using a sink 405 (as shown in FIG. 4) or a toilet 500 (as shown in FIG. 5). The device 100 is shown mounted to the wall 407 such that the sensors are able to monitor and sense the presence of individuals in the environment 400. The sensors are specifically configured to determine if the individual is a child-height individual, thus indicating that a child is present and utilizing one or more fixtures 409 in the environment.

The term "fixtures" is used herein to describe appliances, tools, utensils, or other items which the child-height individual may interact with. In the illustrated examples, the fixtures include a sink and a toilet.

Figure 6:
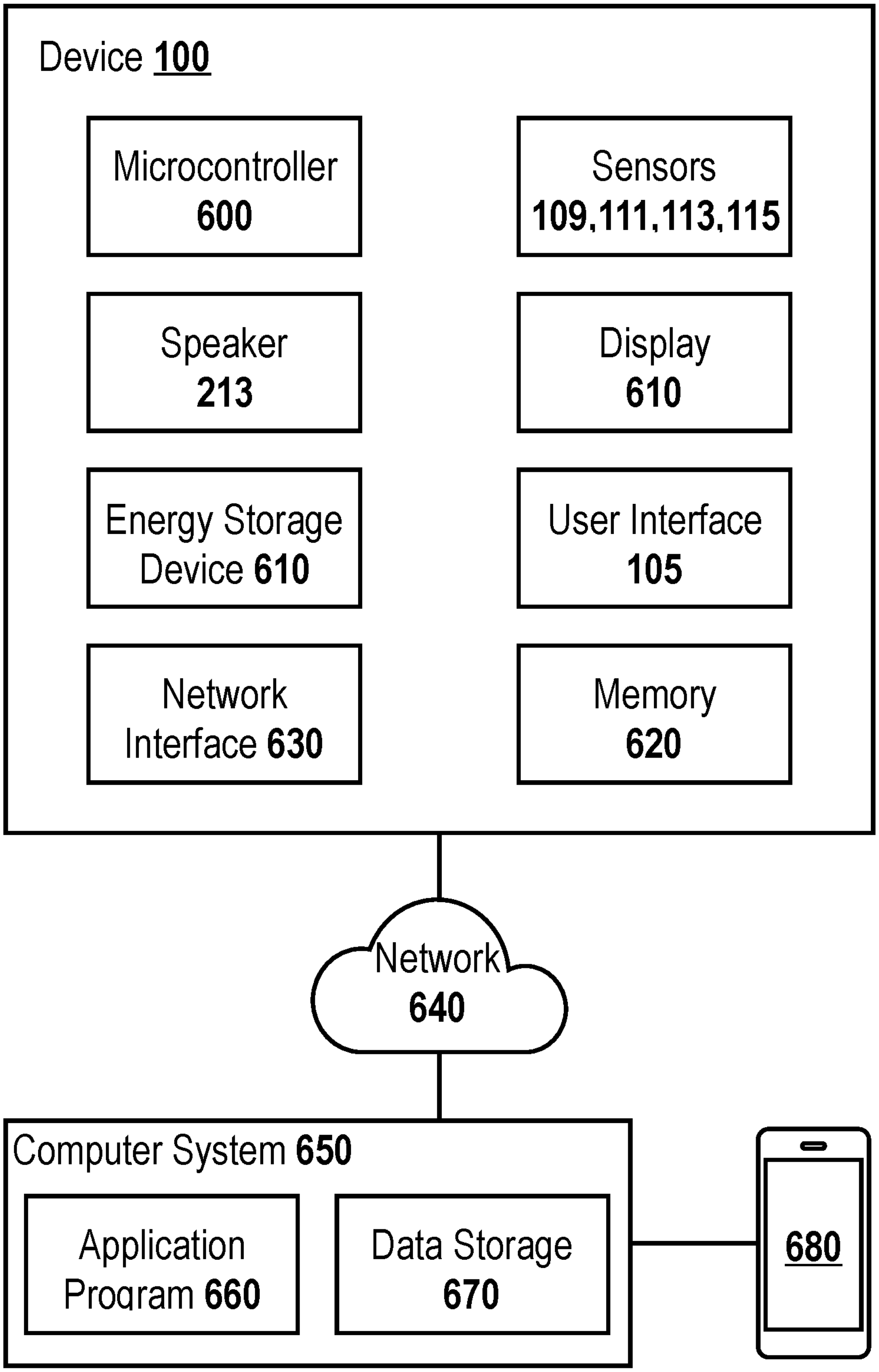
FIG. 6 illustrates a block diagram of the system infrastructure, according to some embodiments.

FIG. 6 illustrates a block diagram of the components of the device 100, and specifically shows the electrical components which provide functionality to the device 100. The device 100 is in electrical communication with a microcontroller 600, speaker 213, sensors 109,111,113,115, display 610, energy storage device 610, user interface 105, network interface 630, and memory 620. The energy storage device 610 can be a rechargeable battery, or other energy storage device to supply power to the device 100. The microcontroller 600 communicates with the memory 620 which stores operational instructions for the device functions. The user interface 105 allows for user input for various functions of the device including volume, displays settings, habit selection, sensitivity of the sensors 109,111,113,115, etc. The display 610 may be configured to provide a visual cue to the child-height individual when they are sensed in the environment.

In some embodiments, the device is capable of having pre-programmed gestural controls. In one example, the device is capable of entering a "sleep mode" when it detects an adult. In such, the device will not emit a cue to the adult. The adult may then re-arm the device before the expiration of the sleep mode by performing a gesture (e.g., holding their hand at a distance, such as 6-inches to 12-inches, from the sensor(s) for a period of time, such as 5-seconds. Other gestural controls may be added to the device to allow the user to perform a gesture and control the function of the device.

The device 100 is in communication with a computer system 650 via a network 640. In another embodiment, the device 100 communicates with the computer system 650 via a hardwired connection such as a USB cable or similar device. The computer system 650 is operable on a user computing device 680 capable of operating the application program 660 capable of executing instructions stored in the data storage 670.

In some embodiments, the application program 660 is capable of allowing the user to input various instructions via the user computing device 680 and control the functionality of the device remotely. For example, the user may utilize their smartphone to input a habit, select and/or record an audio message to be played on the speakers 213, adjust child height settings, etc.

In some embodiments, the computer system 600 includes one or more processors coupled to a memory 620 through a system bus that couples various system components, such as a user interface 105, to the processors. The bus may be any of several types of bus structures including a memory bus or memory controller, a peripheral bus, and a local bus using any of a variety of bus architectures. For example, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

In some embodiments, the computer system 600 includes one or more input/output (I/O) devices, such as video device(s) (e.g., a camera), audio device(s), and display(s) are in operable communication with the computer system 600. In some embodiments, similar I/O devices may be separate from the computer system 600 and may interact with one or more nodes of the computer system 600 through a wired or wireless connection, such as over a network interface.

Processors suitable for the execution of computer readable program instructions include both general and special purpose microprocessors and any one or more processors of any digital computing device. For example, each processor may be a single processing unit or a number of processing units and may include single or multiple computing units or multiple processing cores. The processor(s) can be implemented as one or more microprocessors, microcomputers, microcontrollers, digital signal processors, central processing units, state machines, logic circuitries, and/or any devices that manipulate signals based on operational instructions. For example, the processor(s) may be one or more hardware processors and/or logic circuits of any suitable type specifically programmed or configured to execute the algorithms and processes described herein. The processor(s) can be configured to fetch and execute computer readable program instructions stored in the computer-readable media, which can program the processor(s) to perform the functions described herein.

In this disclosure, the term "processor" can refer to substantially any computing processing unit or device, including single-core processors, single-processors with software multithreading execution capability, multi-core processors, multi-core processors with software multithreading execution capability, multi-core processors with hardware multithread technology, parallel platforms, and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures, such as molecular and quantum-dot based transistors, switches, and gates, to optimize space usage or enhance performance of user equipment. A processor can also be implemented as a combination of computing processing units.

In some embodiments, the memory 620 includes computer-readable application instructions provided by the application program 660, configured to implement certain embodiments described herein, and a data storage 670, comprising various data accessible by the application instructions. In some embodiments, the application instructions include software elements corresponding to one or more of the various embodiments described herein. For example, application instructions may be implemented in various embodiments using any desired programming language, scripting language, or combination of programming and/or scripting languages (e.g., Android, C, C++, C#, JAVA, JAVASCRIPT, PERL, etc.).

In this disclosure, terms "store," "storage," "data store," data storage," "database," and substantially any other information storage component relevant to operation and functionality of a component are utilized to refer to "memory components," which are entities embodied in a "memory," or components comprising a memory. Those skilled in the art would appreciate that the memory and/or memory components described herein can be volatile memory, nonvolatile memory, or both volatile and nonvolatile memory. Nonvolatile memory can include, for example, read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include, for example, RAM, which can act as external cache memory. The memory and/or memory components of the systems or computer-implemented methods can include the foregoing or other suitable types of memory.

Generally, a computing device will also include, or be operatively coupled to receive data from or transfer data to, or both, one or more mass data storage devices; however, a computing device need not have such devices. The computer readable storage medium (or media) can be a tangible device that can retain and store instructions for use by an instruction execution device. The computer readable storage medium can be, for example, an electronic storage device, a magnetic storage device, an optical storage device, an electromagnetic storage device, a semiconductor storage device, or any suitable combination of the foregoing. A non-exhaustive list of more specific examples of the computer readable storage medium can include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. In this disclosure, a computer readable storage medium is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In some embodiments, the steps and actions of the application instructions 140 described herein are embodied directly in hardware, in a software module executed by a processor, or in a combination of the two. A software module may reside in RAM, flash memory, ROM memory, EPROM memory, EEPROM memory, registers, a hard disk, a removable disk, a CD-ROM, or any other form of storage medium known in the art. An exemplary storage medium may be coupled to the processor 110 such that the processor 110 can read information from, and write information to, the storage medium. In the alternative, the storage medium may be integrated into the processor 110. Further, in some embodiments, the processor 110 and the storage medium may reside in an Application Specific Integrated Circuit (ASIC). In the alternative, the processor and the storage medium may reside as discrete components in a computing device. Additionally, in some embodiments, the events or actions of a method or algorithm may reside as one or any combination or set of codes and instructions on a machine-readable medium or computer-readable medium, which may be incorporated into a computer program product.

In some embodiments, the application instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The application instructions can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

In some embodiments, the application instructions can be downloaded to a computing/processing device from a computer readable storage medium, or to an external computer or external storage device via a network 640. A network adapter card or network interface in each computing/processing device receives computer readable program instructions from the network and forwards the computer readable application instructions for storage in a computer readable storage medium within the respective computing/processing device.

In some embodiments, the computer system 600 includes one or more network interfaces 630 that allow the computer system 600 to interact with other systems, devices, or computing environments. In some embodiments, the computer system 100 comprises a network interface 630 to communicate with a network 640. In some embodiments, the network interface 630 is configured to allow data to be exchanged between the computer system 100 and other devices attached to the network 640, such as other computer systems, or between nodes of the computer system 600. In various embodiments, the network interface 630 may support communication via wired or wireless general data networks, such as any suitable type of Ethernet network, for example, via telecommunications/telephony networks such as analog voice networks or digital fiber communications networks, via storage area networks such as Fiber Channel SANS, or via any other suitable type of network and/or protocol.

In some embodiments, the network 640 corresponds to a local area network (LAN), wide area network (WAN), the Internet, a direct peer-to-peer network (e.g., device to device Wi-Fi, Bluetooth, etc.), and/or an indirect peer-to-peer network (e.g., devices communicating through a server, router, or other network device). The network 640 can comprise copper transmission cables, optical transmission fibers, wireless transmission, routers, firewalls, switches, gateway computers and/or edge servers. The network 640 can represent a single network or multiple networks. In some embodiments, the network 640 used by the various devices of the computer system 100 is selected based on the proximity of the devices to one another or some other factor. For example, when a first user device and second user device are near each other (e.g., within a threshold distance, within direct communication range, etc.), the first user device may exchange data using a direct peer-to-peer network. But when the first user device and the second user device are not near each other, the first user device and the second user device may exchange data using a peer-to-peer network (e.g., the Internet). The Internet refers to the specific collection of networks and routers communicating using an Internet Protocol ("IP") including higher level protocols, such as Transmission Control Protocol/Internet Protocol ("TCP/IP") or the Uniform Datagram Packet/Internet Protocol ("UDP/IP").

In some embodiments, the system is world-wide-web (www) based, and the network server is a web server delivering HTML, XML, etc., web pages to the computing devices. In other embodiments, a client-server architecture may be implemented, in which a network server executes enterprise and custom software, exchanging data with custom client applications running on the computing device.

In some embodiments, the system can also be implemented in cloud computing environments. In this context, "cloud computing" refers to a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

In some embodiments, the device consists of two ultrasonic oscillator/receiver pairs, wired to a microcontroller along with a speaker, powered by a battery pack. These elements are installed in an aesthetic housing. The housing mounts to the wall via prismatic bracket, or similar mounting system.

In some embodiments, the device could include a PIR (passive infrared) sensor to aid in detection and to possibly save on electrical power consumption.

In some embodiments, the device could be produced without the secondary proximity sensor that is used for adult-child differentiation. In this configuration, it would simply generate cues whenever any object was detected in its proximity.

In some embodiments, the device may be mounted to the front of the toilet bowl, to the front of the toilet tank, or mounted on a post above the toilet tank.

In some embodiments, the device may include an LED, play a video on a screen, play an audio cue via speakers, or any combination of the aforementioned features as a means for getting the child's attention and training a habit.

Unless otherwise defined, all technical and scientific terms used herein have the same meaning as commonly understood by one of ordinary skill in the art to which this invention belongs. All publications, patent applications, patents, and other references mentioned herein are incorporated by reference in their entirety to the extent allowed by applicable law and regulations. The systems and methods described herein may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

The foregoing is provided for purposes of illustrating, explaining, and describing embodiments of this disclosure. Modifications and adaptations to these embodiments will be apparent to those skilled in the art and may be made without departing from the scope or spirit of this disclosure.

As used herein and in the appended claims, the singular forms "a", "an", and "the" include plural referents unless the context clearly dictates otherwise.

It should be noted that all features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the description does not explicitly state, in a particular instance, that such combinations or substitutions are possible. It is explicitly acknowledged that express recitation of every possible combination and substitution is overly burdensome, especially given that the permissibility of each and every such combination and substitution will be readily recognized by those of ordinary skill in the art.

In many instances entities are described herein as being coupled to other entities. It should be understood that the terms "coupled" and "connected" (or any of their forms) are used interchangeably herein and, in both cases, are generic to the direct coupling of two entities (without any non-negligible (e.g., parasitic intervening entities) and the indirect coupling of two entities (with one or more non-negligible intervening entities). Where entities are shown as being directly coupled together or described as coupled together without description of any intervening entity, it should be understood that those entities can be indirectly coupled together as well unless the context clearly dictates otherwise.

While the embodiments are susceptible to various modifications and alternative forms, specific examples thereof have been shown in the drawings and are herein described in detail. It should be understood, however, that these embodiments are not to be limited to the particular form disclosed, but to the contrary, these embodiments are to cover all modifications, equivalents, and alternatives falling within the spirit of the disclosure. Furthermore, any features, functions, steps, or elements of the embodiments may be recited in or added to the claims, as well as negative limitations that define the inventive scope of the claims by features, functions, steps, or elements that are not within that scope.

An equivalent substitution of two or more elements can be made for any one of the elements in the claims below or that a single element can be substituted for two or more elements in a claim. Although elements can be described above as acting in certain combinations and even initially claimed as such, it is to be expressly understood that one or more elements from a claimed combination can in some cases be excised from the combination and that the claimed combination can be directed to a subcombination or variation of a subcombination.

It will be appreciated by persons skilled in the art that the present embodiment is not limited to what has been particularly shown and described herein. A variety of modifications and variations are possible in light of the above teachings without departing from the following claims.

What is claimed is:

1. A habit-forming device to sense the presence of a child-height individual in an environment, the device comprising:

- a housing mounted via a mounting system to a surface;
- at least one sensor to determine the presence of a child-height individual in an environment;
- a speaker to emit an audible cue to the child-height individual, the audible cue to provide a reminder to perform a habit;
- further comprising a primary proximity sensor configured to detect the presence of an individual; and
- further comprising a secondary proximity sensor configured to determine the height of the individual and to determine if the individual is the child height individual.

2. The habit-forming device of claim 1, further comprising a first cover and a second cover pivotally attached to the housing.

3. The habit-forming device of claim 1, wherein the at least one sensor is comprised of at least one of the following: an ultrasonic proximity sensor and a passive infrared sensor.

4. The habit-forming device of claim 1, further comprising a user interface positioned on a top surface of the housing.

5. The habit-forming device of claim 1, further comprising a display to provide a visual cue corresponding to the habit.

6. The habit-forming device of claim 1, wherein the mounting system include a bracket and a receiver, wherein the bracket is secured to the wall and the receiver permits the removal of the housing from the wall.

7. The habit-forming device of claim 1, further comprising a charging port to receive power input from a power source.

8. A system for facilitating the formation of positive habits via a proximity sensing device, the system comprising:

a habit-forming device including housing mounted via a mounting system to a surface;

at least one sensor to determine the presence of a child-height individual in an environment; and a speaker to emit an audible cue to the child-height individual, the audible cue to provide a reminder to perform a habit;

a computer system including an application program in communication with a user computing device, the application program in communication, via a network, to the habit-forming device to execute, via a process in communication with the application program, computer-readable instructions to establish operational protocols to aid in the formation of habits;

further comprising a primary proximity sensor configured to detect the presence of an individual; and further comprising a secondary proximity sensor configured to determine the height of the individual and to determine if the individual is the child height individual.

9. The system of claim 8, further comprising a memory to store the operational protocols.

10. The system of claim 8, wherein the at least one sensor is comprised of at least one of the following: an ultrasonic proximity sensor and a passive infrared sensor.

11. The system of claim 8, further comprising a user interface positioned on a top surface of the housing.

12. The system of claim 8, further comprising a display to provide a visual cue corresponding to the habit.

13. The system of claim 8, wherein the mounting system include a bracket and a receiver, wherein the bracket is secured to the wall and the receiver permits the removal of the housing from the wall.

14. The system of claim 8, further comprising a charging port to receive power input from a power source.

* * * * *